US011978217B2

United States Patent
Zhang et al.

(10) Patent No.: US 11,978,217 B2
(45) Date of Patent: May 7, 2024

(54) CONTINUOUS LEARNING FOR OBJECT TRACKING

(71) Applicant: Intel Corporation, Santa Clara, CA (US)

(72) Inventors: Lidan Zhang, Beijing (CN); Ping Guo, Beijing (CN); Haibing Ren, Beijing (CN); Yimin Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 612 days.

(21) Appl. No.: 17/057,084

(22) PCT Filed: Jan. 3, 2019

(86) PCT No.: PCT/CN2019/070174
§ 371 (c)(1),
(2) Date: Nov. 19, 2020

(87) PCT Pub. No.: WO2020/140223
PCT Pub. Date: Jul. 9, 2020

(65) Prior Publication Data
US 2021/0312642 A1  Oct. 7, 2021

(51) Int. Cl.
*G06T 7/246* (2017.01)
*G06F 18/22* (2023.01)
(Continued)

(52) U.S. Cl.
CPC .............. *G06T 7/246* (2017.01); *G06F 18/22* (2023.01); *G06F 18/24133* (2023.01);
(Continued)

(58) Field of Classification Search
CPC .................... G06T 7/246; G06T 7/248; G06T 2207/10016; G06T 2207/20081;
(Continued)

(56) References Cited

U.S. PATENT DOCUMENTS 9,898,677 B1 * 2/2018 Anđelković ............................... G06T 7/246
10,740,881 B2 * 8/2020 Wang ...................... G06F 18/22
(Continued)

FOREIGN PATENT DOCUMENTS

CN  102324030 A  1/2012
CN  104767911 A  7/2015
(Continued)

OTHER PUBLICATIONS

International Preliminary Report on Patentability for PCT Patent Application No. PCT/CN19/70174, dated Jul. 15, 2021, 6 pages.
International Search Report and Written Opinion for PCT Patent Application No. PCT/US2019/70174, dated Sep. 9, 2019, 9 pages.

*Primary Examiner* — Matthew C Bella
*Assistant Examiner* — Pardis Sohraby
(74) *Attorney, Agent, or Firm* — Hanley, Flight & Zimmerman, LLC

(57) ABSTRACT

A long-term object tracker employs a continuous learning framework to overcome drift in the tracking position of a tracked object. The continuous learning framework consists of a continuous learning module that accumulates samples of the tracked object to improve the accuracy of object tracking over extended periods of time. The continuous learning module can include a sample pre-processor to refine a location of a candidate object found during object tracking, and a cropper to crop a portion of a frame containing a tracked object as a sample and to insert the sample into a continuous learning database to support future tracking.

19 Claims, 11 Drawing Sheets

(51) Int. Cl.
    *G06F 18/2413* (2023.01)
    *G06N 20/00* (2019.01)
    *G06V 10/764* (2022.01)
    *G06V 10/82* (2022.01)
    *G06V 20/52* (2022.01)

(52) U.S. Cl.
    CPC ............. *G06N 20/00* (2019.01); *G06T 7/248* (2017.01); *G06V 10/764* (2022.01); *G06V 10/82* (2022.01); *G06V 20/52* (2022.01); *G06T 2207/10016* (2013.01); *G06T 2207/20081* (2013.01); *G06T 2207/20084* (2013.01); *G06V 2201/07* (2022.01)

(58) Field of Classification Search
    CPC . G06T 2207/20084; G06T 2207/30196; G06F 18/22; G06F 18/24133; G06N 20/00
    USPC .......................................................... 382/103
    See application file for complete search history.

(56) References Cited

U.S. PATENT DOCUMENTS

| | | | | |
|---|---|---|---|---|
| 2008/0159590 | A1* | 7/2008 | Yi | G06V 10/462 |
| | | | | 382/103 |
| 2014/0185924 | A1 | 7/2014 | Cao et al. | |
| 2018/0374219 | A1* | 12/2018 | Zhang | G06V 40/168 |
| 2020/0034976 | A1* | 1/2020 | Stone | G06F 18/22 |
| 2020/0059595 | A1* | 2/2020 | Ono | H04N 23/611 |

FOREIGN PATENT DOCUMENTS

| | | | | |
|---|---|---|---|---|
| CN | 104866853 A | * | 8/2015 | |
| CN | 105760854 A | | 7/2016 | |
| CN | 108898623 A | * | 11/2018 | ............. G06T 7/246 |
| KR | 20130056171 A | * | 10/2012 | ............. G06T 7/269 |

* cited by examiner

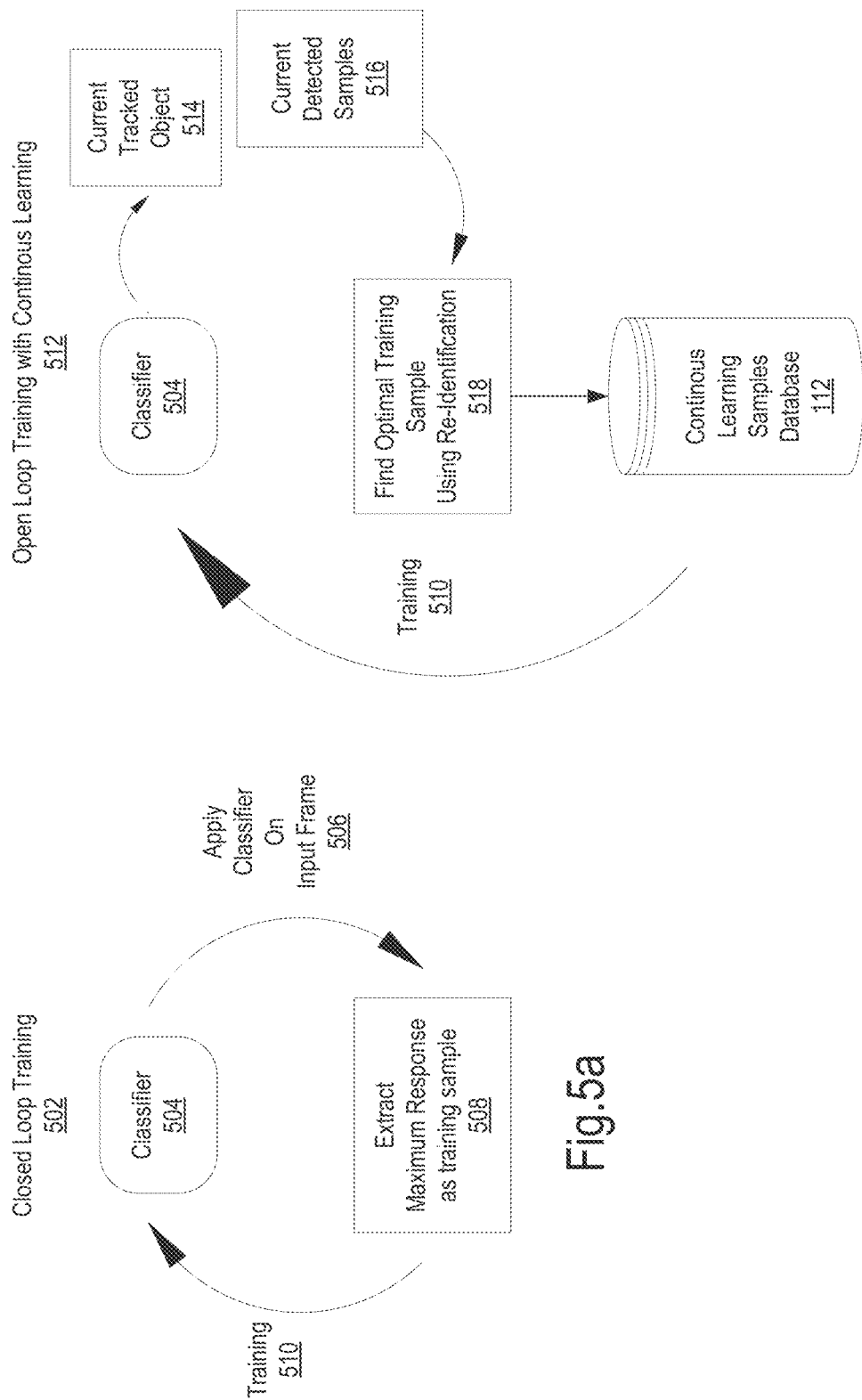

CONTINUOUS LEARNING FOR OBJECT TRACKING

RELATED CASES

This application is a U.S. National Phase application under 35 U.S.C. § 371 of International Application No PCT/CN19/70174, filed Jan. 3, 2019 entitled, "CONTINUOUS LEARNING FOR OBJECT TRACKING", which is incorporated by reference in its entirety.

TECHNICAL FIELD

The technical field relates generally to computer vision and, in particular, to object tracking in computer vision.

BACKGROUND ART

In computer vision, object tracking refers to locating an arbitrary target in multiple frames of a video sequence or in a live captured stream. Object tracking is used in many computer vision applications, such as video analysis, surveillance, robotics, augmented reality and video editing. One of the goals in object tracking is to track a target object over an extended period of time, referred to herein as long-term object tracking. Long-term object tracking can be challenging due to various factors that cause variations in the appearance of the target object over time, such as occlusion by other objects, rigid or non-rigid transformation of the target object itself, camera movement while capturing images of the target object that can cause motion blur, illumination change, etc. For example, if the target object is a person under surveillance while walking through an airport terminal, the appearance of the person can change over time depending on their attire, surroundings, actions and location relative to other nearby persons walking through the terminal.

BRIEF DESCRIPTION OF THE DRAWINGS

The described embodiments are illustrated by way of example and not limitation in the figures of the accompanying drawings. The methods, processes and logic depicted in the figures that follow can comprise hardware (e.g. circuitry, dedicated logic, controllers, etc.), software (such as is run on a general-purpose computer system or a dedicated machine, e.g. a software module or logic), and interfaces (such as a memory interface) between hardware and software, or a combination of both. Although the depicted methods, processes and logic may be described in terms of sequential operations, it should be appreciated that some of the described operations can be performed in a different order. Moreover, some operations can be performed in parallel rather than sequentially. The following figures include like references that indicate similar elements and in which:

FIGS. 5A-5B are schematic block diagrams illustrating contrasting schemas for training for long-term object tracking with and without continuous learning in accordance with various examples described herein;

Other features of the described embodiments will be apparent from the accompanying drawings and from the detailed description that follows.

DESCRIPTION OF THE EMBODIMENTS

In computer vision the typical framework for tracking objects includes an object detection module, an object tracker module and an object identification module implemented in accordance with an object tracking model. The object tracking model, also referred to as an online object tracking model in the context of long-term object tracking, is a type of machine learning model that includes a machine learning algorithm and training data. The machine learning algorithm learns from the training data to produce an object tracking model to track objects over time.

The object detection, object tracker and object identification modules implemented in accordance with the object tracking model employ a machine learning classifier to discriminate between objects based on appearance features of objects observed over time. The machine learning classifier is a mathematical model of a set of data representing the appearance features. Using convolutional neural networks, the machine learning classifier is able to identify tracked objects based on the data representing the appearance features.

Figure 1:
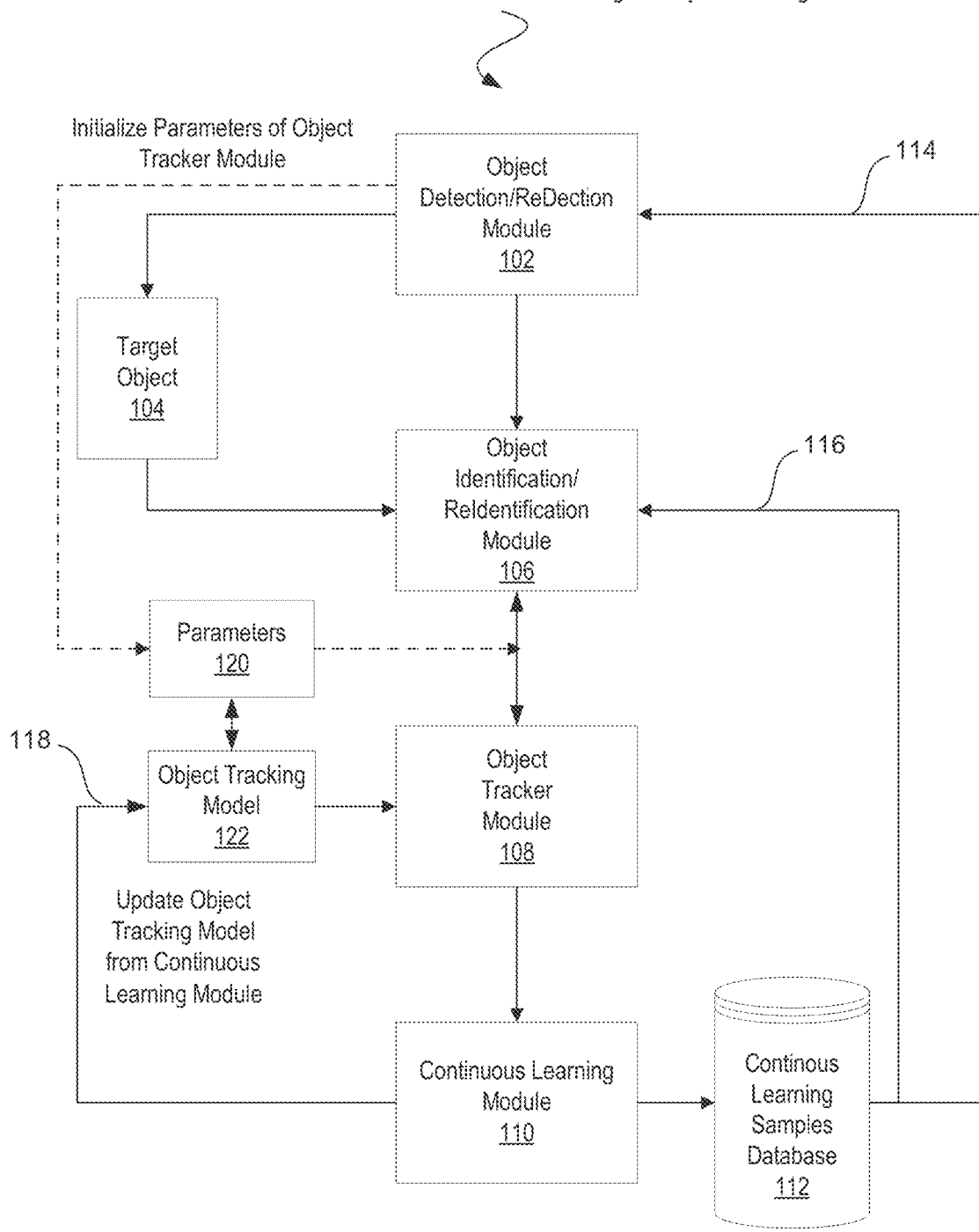
FIG. 1 is a schematic, block diagram illustration of a framework for continuous learning for long-term object tracking in accordance with various examples described herein.

With reference to FIG. 1, to begin tracking, an object detection module 102 initializes an object tracker module 108 to track a particular object, referred to herein as a target object 104. The object detection module 102 provides an accurate bounding box for any specified target. It can be implemented using state-of-the-art object detectors, such as FAST R-CNN (Fast Region-Based Convolutional Network), Mask R-CNN (Mask Region-Based Convolutional Network), SSD (Single Shot Detection Neural Network), YOLO (You Only Look Once real-time object detection), etc. It can also be implemented with user interaction.

The detection module 102 initializes one or more tracking parameters 120 of the object tracker module 108 by learning a corresponding one or more appearance features of the target object 104 in a frame in which the target object was detected. The frame refers to an image in a sequence of video frames or a sequence of images captured in a video stream and the like.

Generally, once the target object 104 is initialized with a bounding box, the object tracker module 108 will initialize the object tracking model 122 parameters 120 with a given annotation corresponding to an appearance feature of the target object 104. The object tracker module's parameters 120 depend on the type of object tracking model 122 being used. In this case, the module's parameters 120 correspond to the learned appearance features of the target object 104 being tracked. The learned appearance features can include such characteristics as color, shape and so forth. Such features are used to discriminate one detected object from another using the machine learning classifier.

In subsequent frames, the object tracker module 108 searches around the last known position of the target object 104. The last known position of the target object is the position after the initial detection or the position after the last time the target object was successfully tracked in a previous frame. The object tracker module 108 attempts to find the target object at the last known position using the target object's one or more learned appearance features. For example, the target object 104 can be found by maximizing a response of the object tracking model 122 and using the response as the prediction of the target object's future position in a subsequent frame or frames.

The object identification module 106 is configured to check whether the tracking of the target object 104 by the object tracker module 108 is successful. In some cases, the target object cannot be found in a subsequent frame, such as when the target object moves out of the frame. In other cases, the target object 104 can undergo a large appearance variation due to occlusion, deformation, etc., that causes object tracker module 108 to lose track of the target object, or that the object identification module 106 cannot identify as the target object. Either way, once the target object 104 is lost the object tracker module 108 is reset by clearing all of the tracking model parameters 120 that were set when the object tracker module 108 was initialized. The object detection module 102 re-initializes the object tracker module 108 to start over by re-detecting anew the target object 104.

During object tracking, as long as the target object 104 is found then tracking continues. In other words, if the target object 104 was tracked and successfully identified based on the object tracker module 108 parameter settings, new samples containing the target object 104 can be obtained from the frames in which they are found using the tracking position. The new samples, also referred to as patches that are cropped from the frames, are used to update 118 the object tracking model 122 to accommodate target object deformation. For example, if an appearance of the target object 104 changes over time, the new samples/patches encompassing the target object are used to update the parameters 120 of the object tracker module 108 to reflect the learned appearance features of the target object, including the deformation of the target object.

One of the most challenging problems in implementing object tracking using the above-described framework (object detection module 102, object identification module 106 and object tracker module 108 in accordance with an object tracking model 122 and associated parameters 120) is drift in the tracking position of the target object 104 over time. Drift is typically due to error propagation from updating the object tracking model 122 implemented by the object tracker module 108 with the new samples/patches encompassing the target object 104. When drift occurs, the tracking result obtained by the object tracker module 108 is offset from the true position of the target object 104. As a result, the new samples/patches that were cropped using the "drifted" target position instead of the true position contain incorrect information about the target object 104.

Among other errors, drift increases the likelihood that the object tracker module 108 will interpret some backgrounds in the new samples/patches encompassing the target object 104 as foreground and vice versa. With the aggregation of more samples/patches, the object tracker module 108 learns incorrect knowledge about the target object 104. As a consequence, in subsequent frames the object tracker module 108 searches for the target object 104 in the wrong location. In other words, the object tracker module 108 searches for the target object 104 in the "drifted" position and away from the true position. Searching in the wrong location further exacerbates drift and eventually results in tracking failure. For this reason, object tracking in current computer vision applications is accurate only for short periods of time, typically less than one minute.

For instance, the Visual Object Tracking (VOT) repository of datasets for establishing benchmarks in object tracking (http://www.votchallenge.net) support tracking that lasts, on average, from only 7 to 30 seconds. Such time constraints impair the ability to use object tracking in real-world situations prone to failure due to, for example, object occlusion (e.g. by other objects in the frame), the movement of the object out-of-frame, and/or the presence of a similar appearance feature (e.g., a similar color), of the object in background that make the object hard to "see," and the like. To adapt an object tracking model 122 for real-world practical applications, the object tracker module 108 is forced to accommodate drift by resetting and restarting when tracking fails or at regular time intervals.

However, resetting and restarting the object tracker module 108 discards potentially valuable samples obtained prior to tracking failure. Discarding samples causes the object tracker module 108 to forget already learned information and deteriorates the ability of the object tracking model 122 to discriminate among potential candidate objects for long-term object tracking.

To address the challenge of drift in the tracking position during long-term object tracking, embodiments of continuous learning for long-term tracking includes a continuous learning framework 100. Rather than discarding samples that contain learned appearance features of the target object when resetting and restarting the object tracker module 108, in one embodiment, the continuous learning framework 100 improves tracking by continuously accumulating samples on a large scale and storing the accumulated samples in a continuous learning samples database 112.

In one embodiment, using the accumulated samples stored in the continuous learning samples database 112, a continuous learning module 110 continuously updates the current object tracking model 122 based on the learned appearance features contained in the accumulated samples. By using a continuously updated object tracking model 122, the continuous learning module 110 avoids introducing poor-quality samples that contain inaccurate appearance feature data, thereby limiting error propagation. In one embodiment, a current object tracking model 122 capable of being continuously updated includes a discriminative correlation filter (DCF) using factorized convolution operators to reduce the number of parameters in the object tracking model 122.

Figure 2:
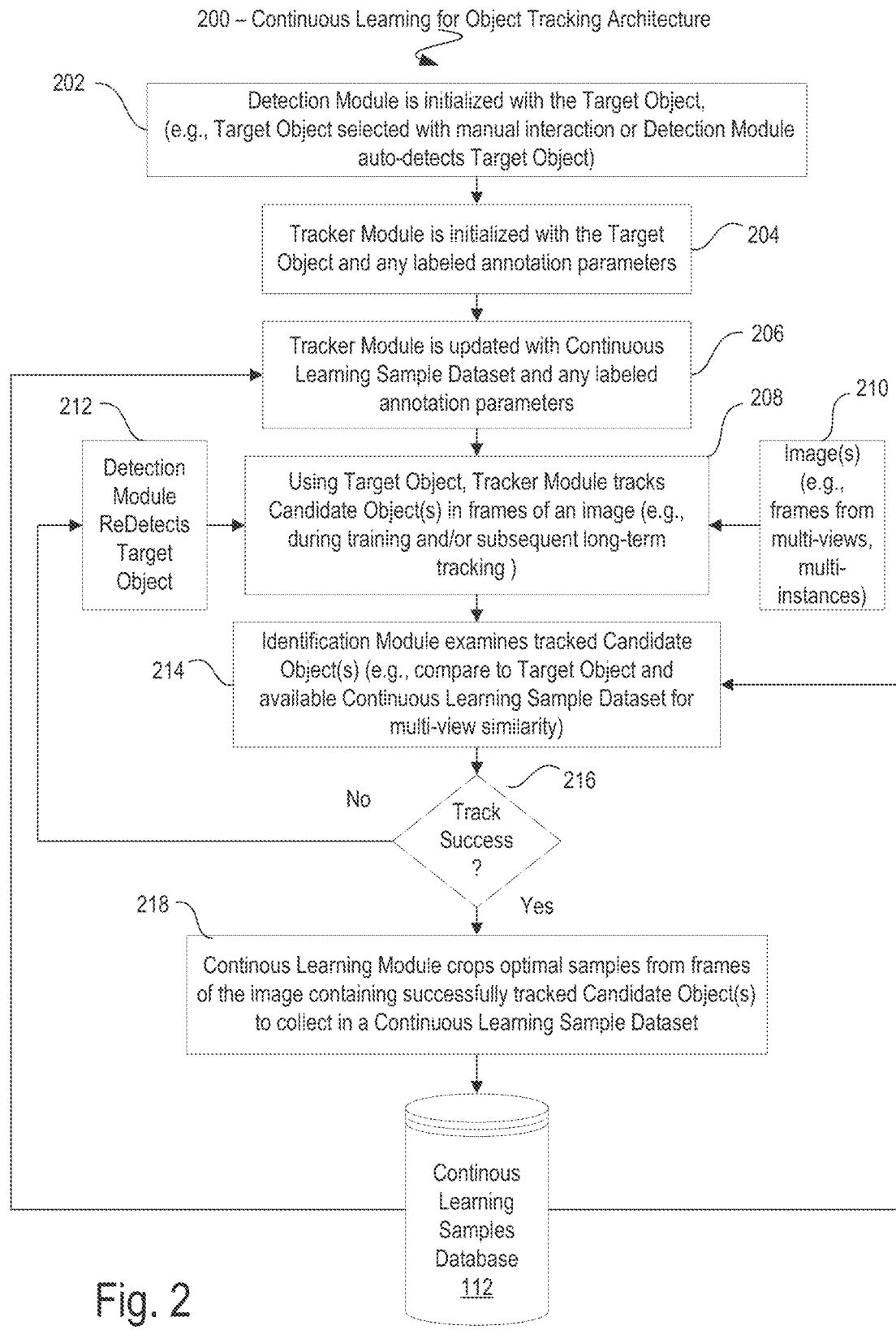
FIG. 2 is a schematic, block diagram illustration of an architecture for implementing continuous learning for long-term object tracking in accordance with various examples described herein.

FIG. 2 is a schematic block diagram illustration of an architecture 200 for implementing continuous learning for long-term object tracking in accordance with various examples described herein. In one embodiment, at process 202, an object detection module 102 is initialized with the target object 104. For example, the target object 104 can be selected with a manual interaction or the object detection module 102 can auto-detect the target object 104, including re-detecting the target object, the latter typically based on prior manual and/or training detections of the target object 104.

At process 204, the object tracker module 108 is initialized with the detected (or re-detected) target object 104 and any labeled annotation parameters obtained during detection. The labeled annotation parameters correspond to the learned appearance features of the target object 104. At process 206, the object tracker module 108 is updated with the continuous learning samples database 112 with samples accumulated during previous successful tracking, including any labeled annotations of the target object found in the accumulated samples.

In one embodiment, at process 208, using the target object 104 the object tracker module 108 tracks potential candidate objects in subsequent frames of the video images, such as during training and/or during subsequent long-term object tracking. The target object 104 can be the initial target object from process 202, or a re-detected target object from process 212. The image(s) 210 in which the target object 104 is tracked includes one or more video images, also referred to as frames, from any one or more views (multi-views) generated by multiple image capture devices. The image(s) 210 can also include multi-instances of a single image.

In one embodiment, at process 214, the object identification module 106 examines tracked candidate objects. For example, the object identification module 106 can compare the features of a tracked candidate object to the target object 104 as well as to the available views of the target object 104 identified in accumulated samples stored in the continuous learning sample database 112 to examine multi-view similarity.

In one embodiment, the object identification module 106 includes a re-identification network to distinguish whether a tracked area contains the target object 104. For example, the re-identification network extracts appearance features by forwarding observed features in the tracked area to a deep neural network. The object identification module 106 calculates the distance between the extracted appearance features present in the tracked area and the appearance features present in the target object 104. The object identification module 106 further calculates the distance between the extracted appearance features present in the tracked area and the appearance features present in the accumulated samples stored in the continuous learning sample database 112 for the target object 104.

At decision process 216, if the average distance between the extracted appearance features present in the tracked area and the appearance features present in target object 104 and accumulated samples is smaller than an identity threshold, the tracking result is successful, increasing the likelihood of success in continuing to track the target object 104 without resetting the object tracker module 108, including without having to re-detect the target object 104. The tracking result is a tracking response map of the candidate object in the tracked area. Upon successful tracking, at process 218, the continuous learning module 110 can proceed to crop a sample from frame in which a successfully tracked candidate object appears, and to collect all such cropped samples in a continuous learning sample dataset for the target object 104 for eventual storage in the continuous learning samples database 110.

Object tracking is considered unsuccessful in certain circumstances. For example, if the average of the distances between the extracted appearance features present in the tracked area and the appearance features present in target object 104 and accumulated samples is larger than the identity threshold, the object tracker module 108 is lost. The target object 104 must be re-detected by the object detection module 102 before further object tracking can take place. Thus, at process 212 the object detection module 102 proceeds to re-detect the target object 104 in the current frame.

Even when tracking is unsuccessful, because the object tracker module 108 has been updated with the cropped samples in the continuous learning sample dataset from one or more previous successful tracking results, including any labeled annotation parameters accompanying the cropped samples, the object tracker module 108 can use the re-detected target object 104 to continue long-term tracking without losing the valuable information in the accumulated samples stored in the continuous learning sample database 112.

Figure 3:
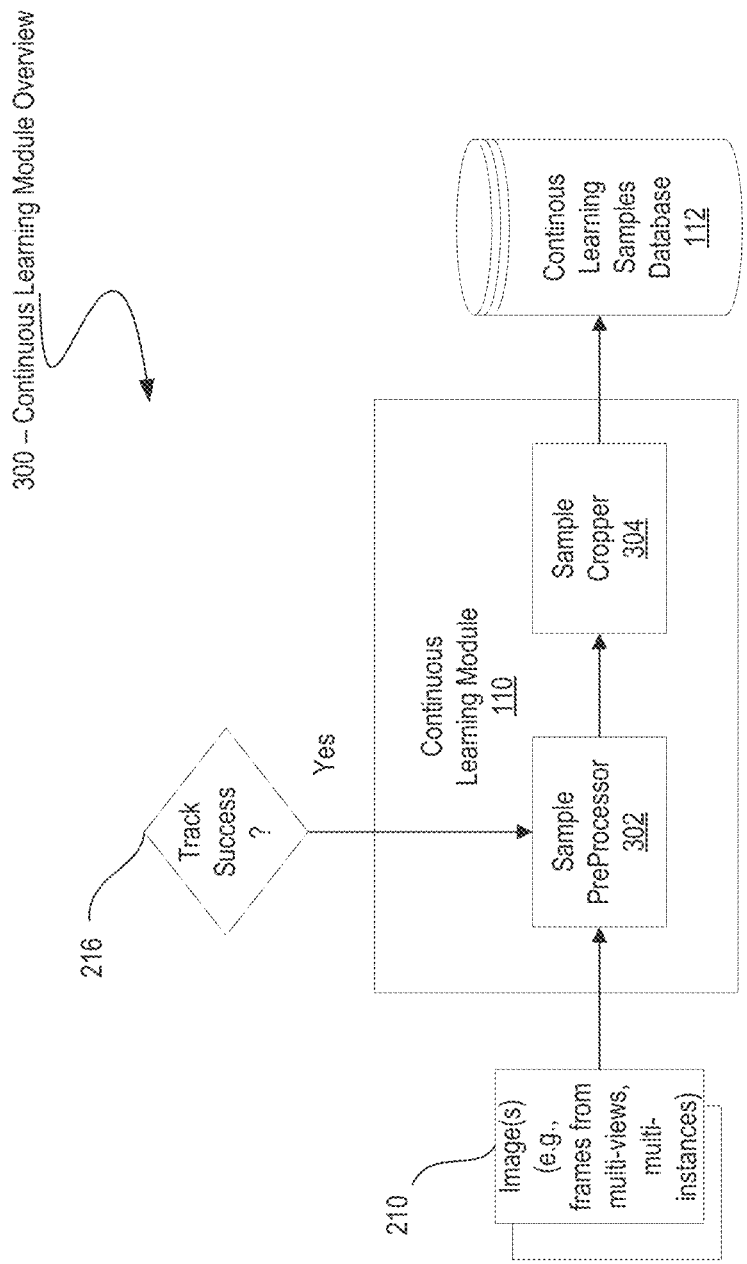
FIG. 3 is a schematic, block diagram illustration of an overview of a continuous learning module for implementing continuous learning for long-term object tracking in accordance with various examples described herein.

FIG. 3 is a schematic block diagram illustration of an overview 300 of a continuous learning module 110 for implementing continuous learning for long-term object tracking in accordance with various examples described herein. In one embodiment, the continuous learning module 110 includes a sample pre-processor 302 and a sample cropper 304.

In one embodiment, the sample pre-processor 302 is configured to refine a location of a candidate object found in the object tracker module's 108 tracking result using, for example, a refinement net and/or clustering the accumulated samples from the continuous learning samples database 112. Once the location of a candidate object has been refined, a sample cropper processor 304 crops a patch from the whole image to form the sample and inserts the sample into a continuous learning sample dataset for memorizing all variations of the target object's 104 deformations represented in the cropped samples.

Figure 4:
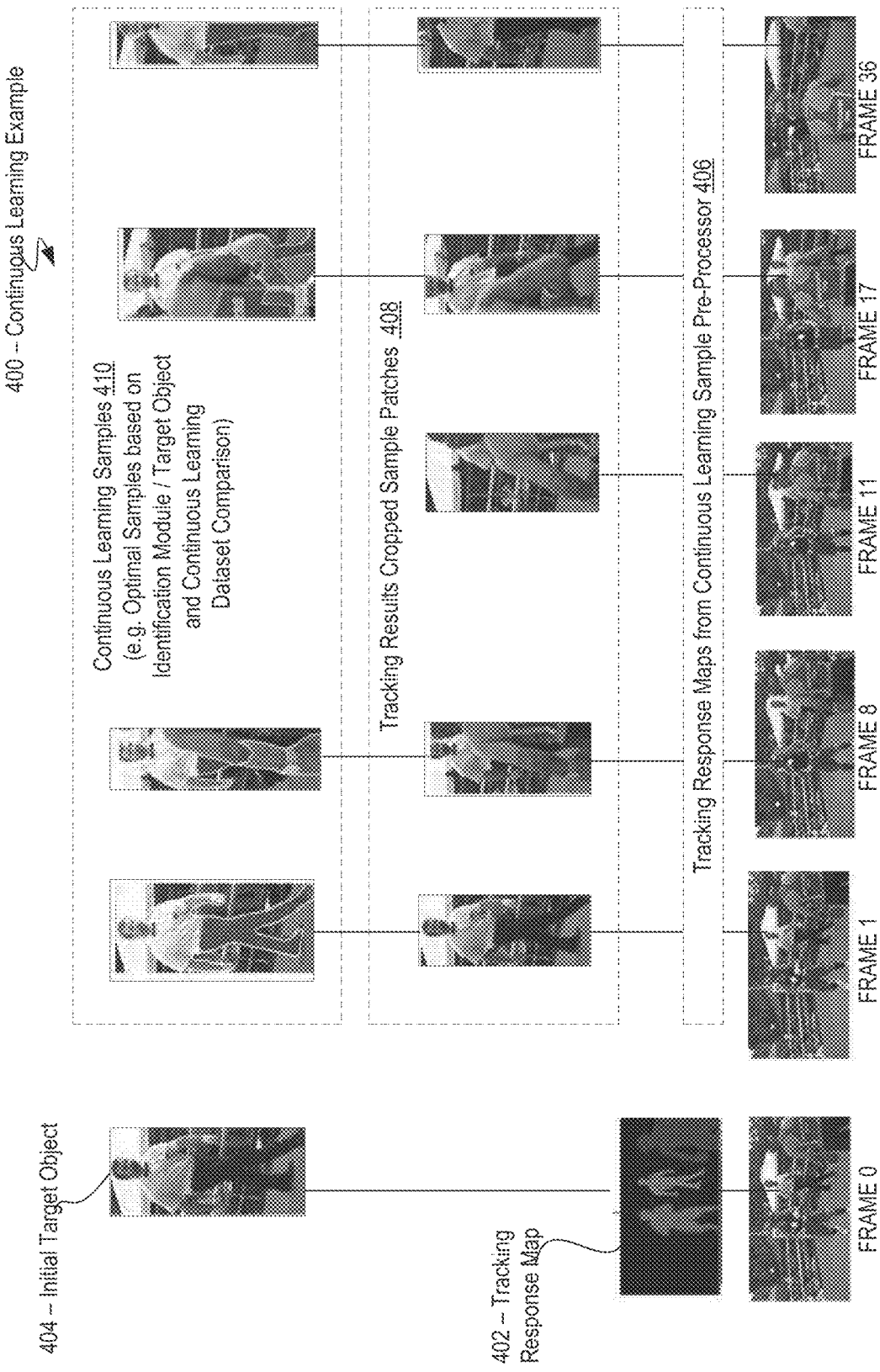
FIG. 4 is an illustration of a sequence of video frames containing a target object for which continuous learning for long-term object tracking is implemented in accordance with various examples described herein.
Figure 6A:
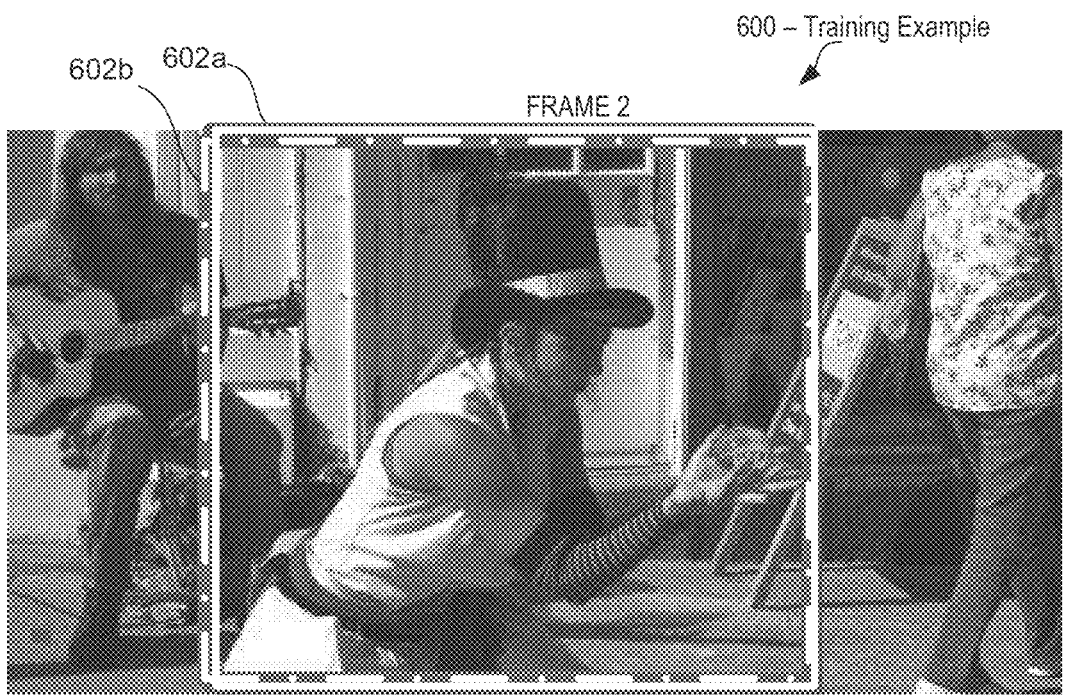
FIGS. 6A-6E illustrate another sequence of video frames containing a target object for which continuous learning for long-term object tracking is implemented in accordance with various examples described herein.
Figure 6B:
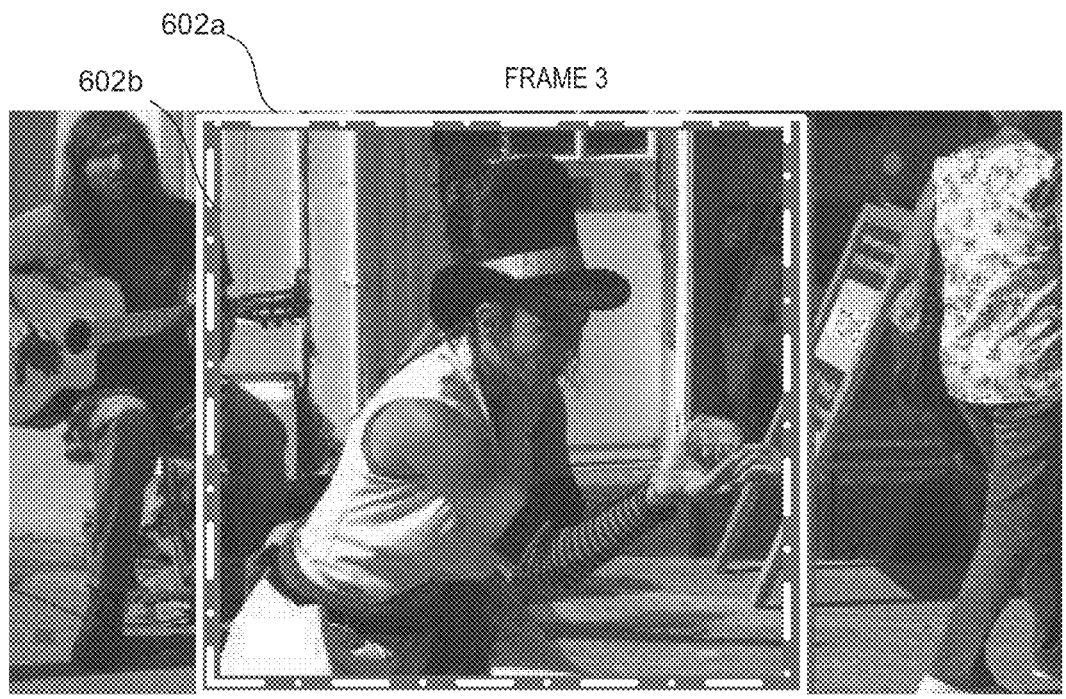
Figure 6C:
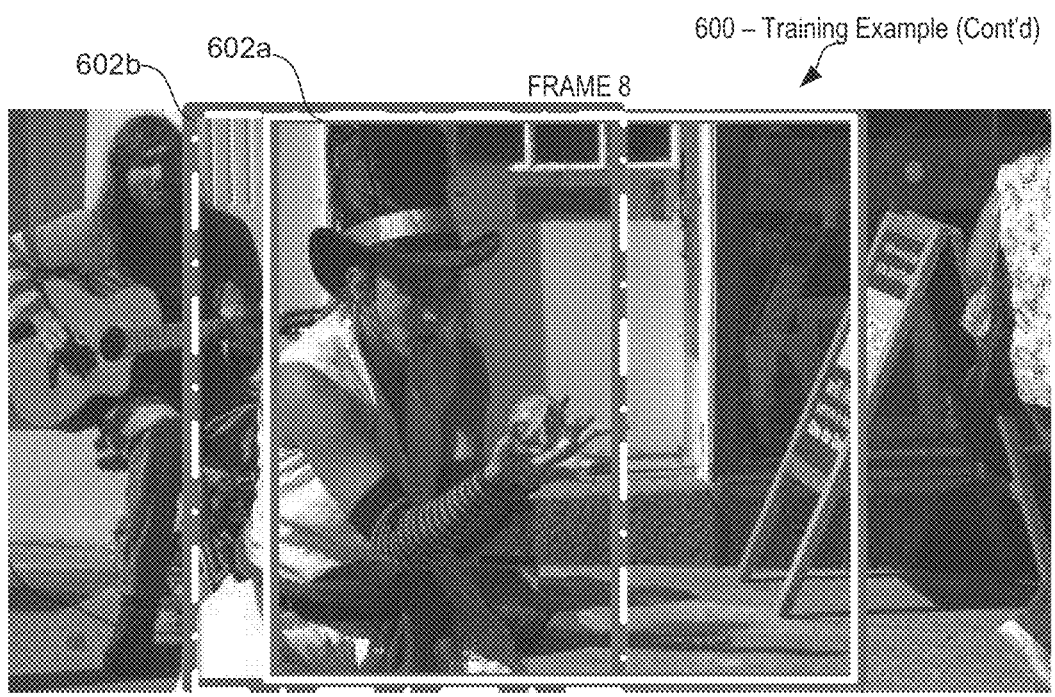
Figure 6D:
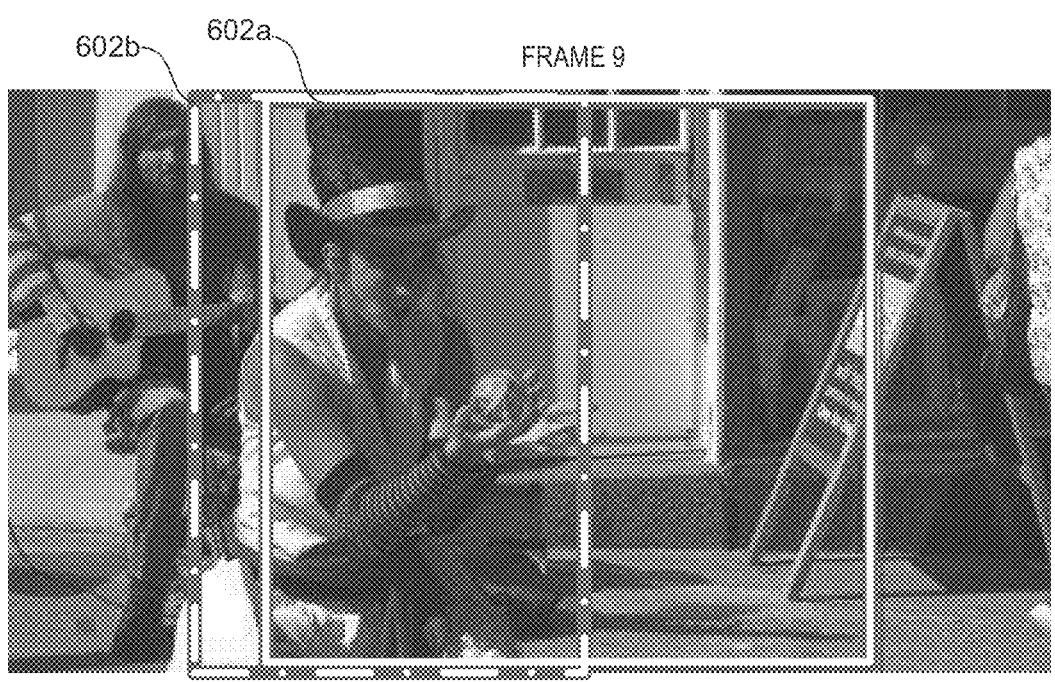
Figure 6E:
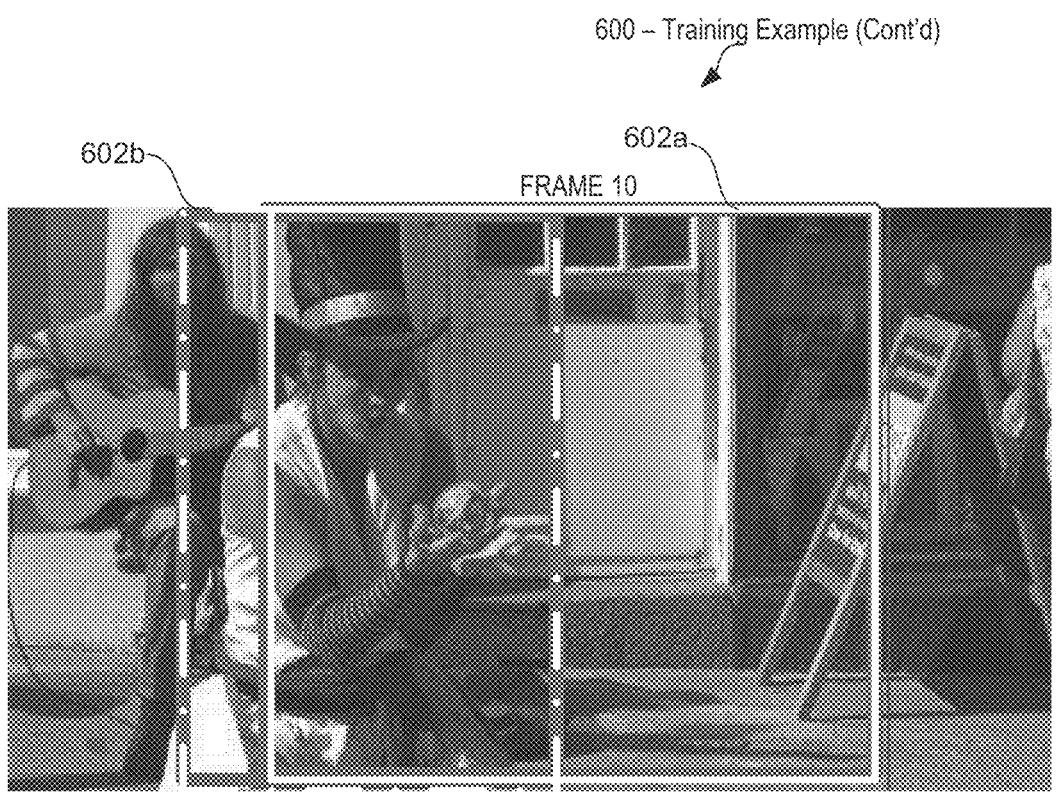
Figure 7A:
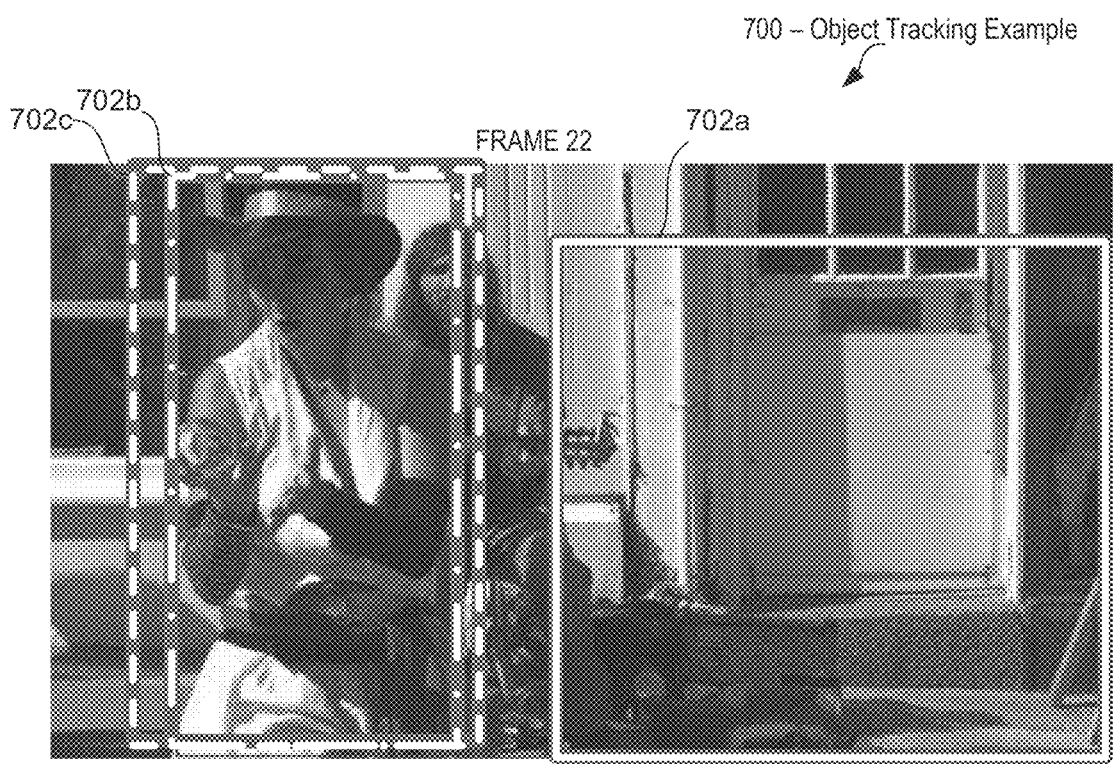
FIGS. 7A-7D illustrate a further sequence of video frames containing a target object for which continuous learning for long-term object tracking is implemented in accordance with various examples described herein.
Figure 7B:
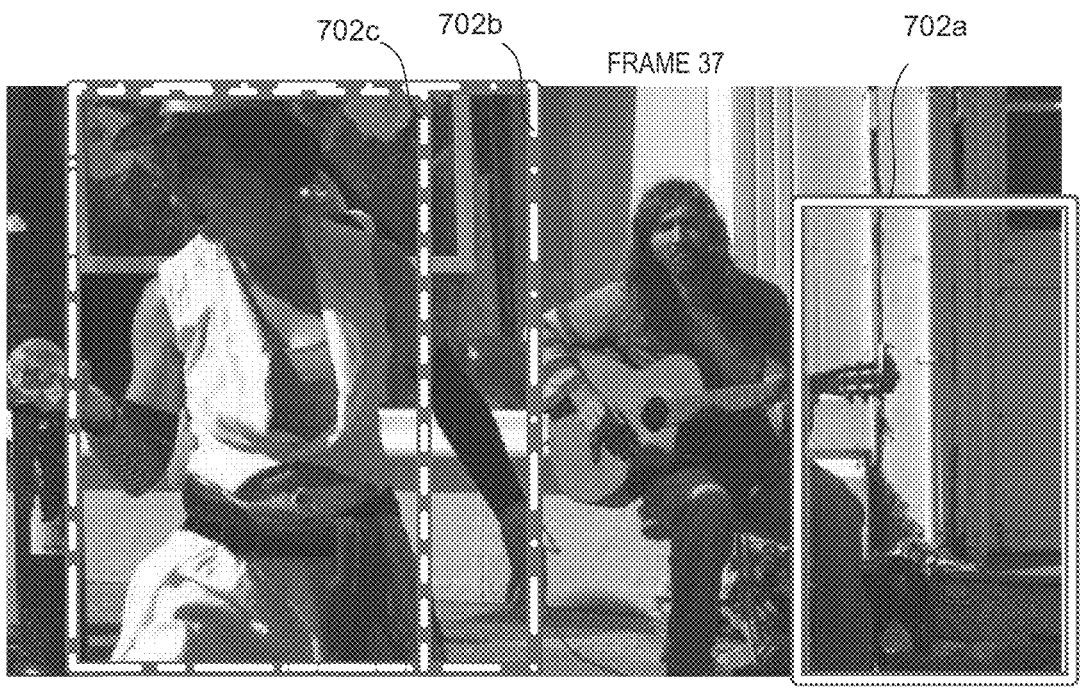
Figure 7C:
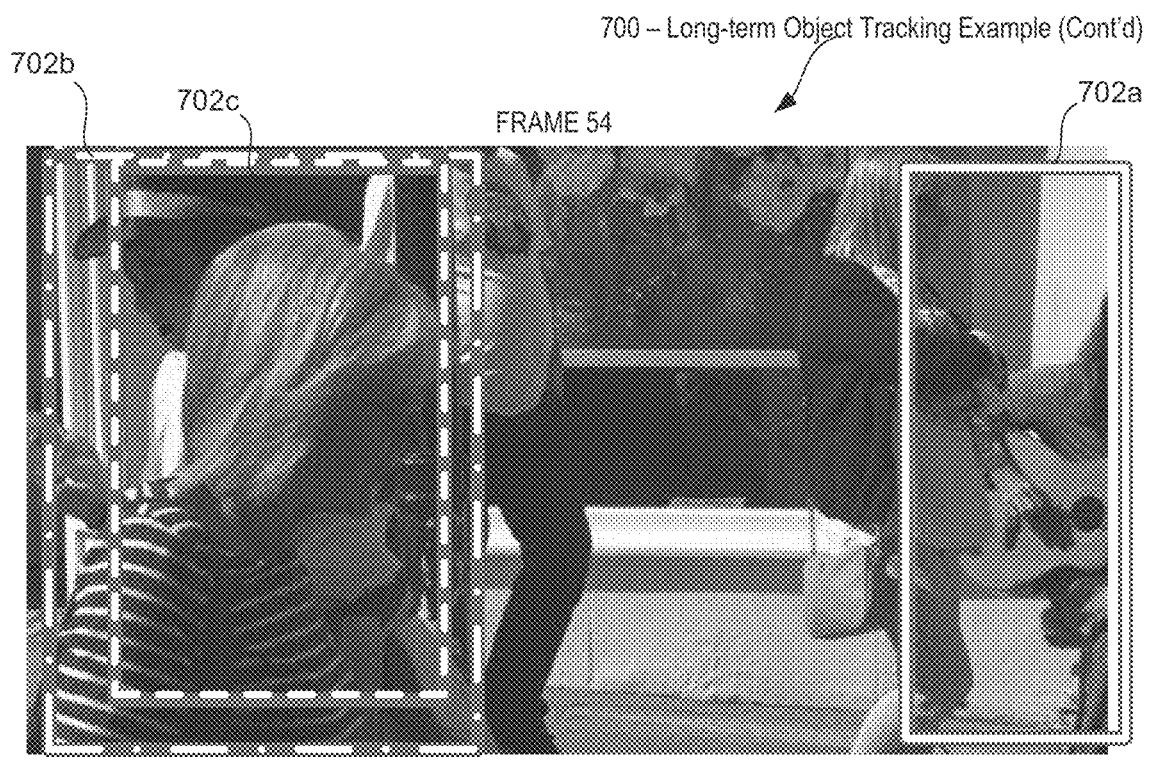
Figure 7D:
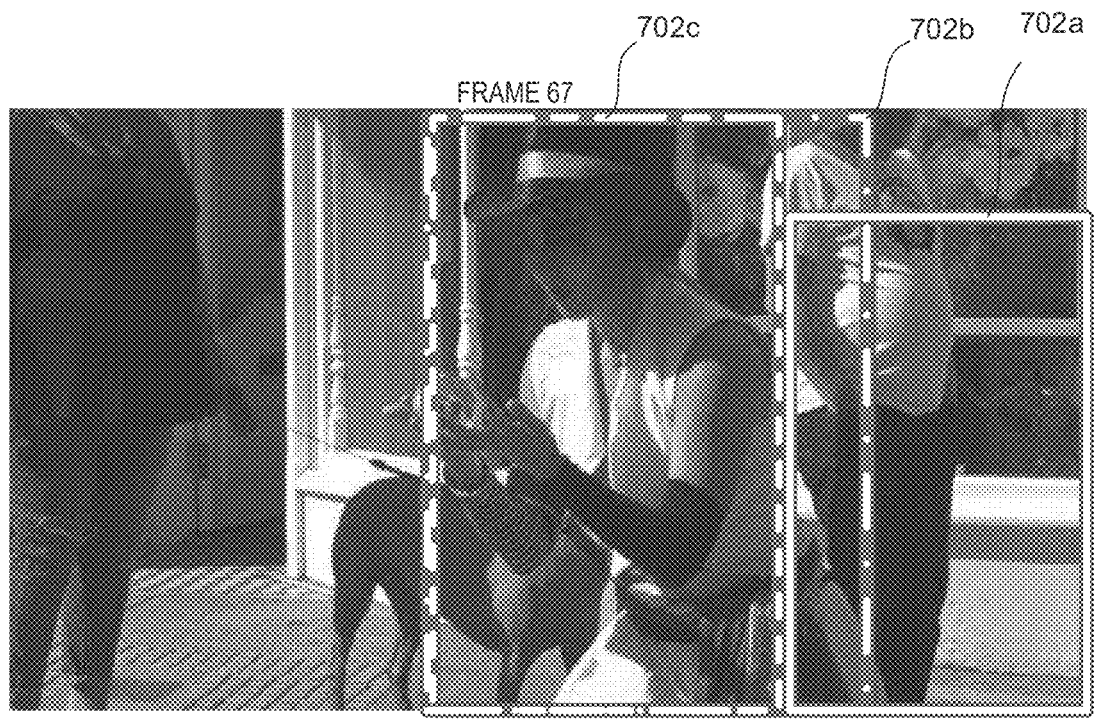

The above-described architecture of continuous learning for long-term object tracking illustrated in FIGS. 2-3 is demonstrated in the example illustrated in FIG. 4. A series of input frames, FRAME 0, FRAME 1, FRAME 8, FRAME 11, FRAME 17 and FRAME 36 contain video images of a boxing match between two boxers and a referee overseeing the boxing match. An object detection module 102, object identification module 106 and object tracker module 108 generate an initial tracking response map 402 that identifies the boxers and the referee. By way of example only, the initial target object 404 is the referee as initialized in FRAME 0, and as tracked in the tracking response maps 405 generated by the object tracker module 108 from subsequent frames FRAME 1, FRAME 8, FRAME 11, FRAME 17 and FRAME 36.

In one embodiment, a set of five tracking result patches 408 are cropped from the frames that encompass candidate objects representing the tracked referee in various poses and with varying amounts of target deformation as compared to the appearance of the tracked referee in the initial target object 404.

In one embodiment, a subset of four tracking result patches 408 are collected as continuous learning samples 410 into a continuous learning samples dataset. A fifth tracking result patch 408 (appearing in the middle of the set of five tracking result patches) is not collected in the continuous learning samples 410 since it contains too small a segment of the target object 104 (the tracked referee's shoulder) to be of value. The collected continuous learning samples 410 reveal the appearance of the target object 404, the tracked referee, during different circumstances. For example, if the tracked referee is occluded by one of the boxers, certain segments of the referee will still be visible and can be valuable for future tracking. In one embodiment, the collected continuous learning samples 410 are stored in the continuous learning samples database 112 for subsequent use during training and/or during long-term tracking.

In one embodiment the continuous learning samples 410 are used in the object identification module 106 to determine whether the candidate object in a particular tracking result is, in fact, the target object 104/404. In one embodiment, by calculating the average distance between the appearance features of the target object 104/404 and each of the appearance features extracted from the continuous learning samples 410 as described in more detail with reference to FIGS. 2-3, the object identification module 106 implements an algorithm for multi-view comparisons that is robust to noises.

In the illustrated example in FIG. 4, the four optimal cropped patches encompassing the candidate objects and collected as continuous learning samples 410 are those that contain the best views of the tracked referee. The best views in the continuous learning samples 410 are those in which the average distances between appearance features of the candidate object as compared to the appearance features of the target object 104 is sufficiently small to identify the candidate object as the target object 104. In the illustrated example of FIG. 4, the target object 104 used for comparison is the tracked referee/initial tracked object 404. In one embodiment, the distances between the appearance features are calculated using an identity threshold distance. The identity threshold distance can be any of predetermined and/or dynamically configured based on, for example, a size of the target object 104 being tracked relative to other objects in an input frame.

In the illustrated example in FIG. 4, the sample pre-processor 302 of FIG. 3 can be configured with a segmentation module to refine the tracked referee's location. In one embodiment, by way of example only and not limitation, the segmentation module is used by the sample pre-processor 302 to label the continuous learning samples 410 with a segmentation contour appearance feature that outlines the contours of various segments comprising the initial target object 404 being tracked and the candidate objects that successfully track to the initial target object 404. Of course, other pre-processing methods can be used to improve the quality of the continuous learning samples 410.

The continuous learning samples 410 accumulated in the continuous learning sample dataset and stored in the continuous learning samples database 112 are valuable because they carry the labeling information (also referred to as annotations) for the target object 104/404 and candidate objects without manual intervention. The continuous learning samples 410 are used in the various embodiments of continuous learning for long-term object tracking to improve detection and identification accuracy.

FIGS. 5A-5B are schematic block diagrams illustrating contrasting schemas for training for long-term object tracking with and without continuous learning in accordance with various examples described herein. For example, FIG. 5A illustrates a standard tracking algorithm employing a closed-loop training process 502 in which one sample is extracted and used as the training sample. During operation of the closed-loop training process 502, a discriminative classifier 504 for an initial target object is applied to an input frame 506 to extract a maximum response as a training sample 508. During training 510, the training sample 508 is used, in turn, to update the discriminative classifier 504.

In contrast, in an open-loop training process 512 with continuous learning multiple training samples are used to improve accuracy and identification in long-term object tracking. For example, to break the closed-loop an object re-identification module (e.g., the object identification module 106) is introduced to help the object tracker module 108 to find a more accurate location of the tracked target object 104 in subsequent frames. In one embodiment, during long-term object tracking, the object re-identification module 106 can be invoked periodically, such as every N frames, to increase the accuracy of the object tracking model 122 and parameters 120 used to implement the object tracker module 108, object identification module 106 and object detection module 102.

For example, during open-loop training with continuous learning 512, the current tracked object 514 (the candidate objects) and current detected object 516 (the target object) are both used in the re-identification module 106 to find accurate training samples during training 510 as well as during long-term object tracking. The accurate training samples are stored in the continuous learning samples database 112 for subsequent use during application of the discriminatory classifier 504 to subsequent frames of a sequence of video frames.

In one example scenario, a target object 104 might deform too much during long-term tracking such that re-identification with the first annotation with which the initial target object 104 is labeled might not be possible. This scenario is demonstrated in the training example 600 illustrated in FIGS. 6A-6E. An object tracker module 108 attempts to track a female street performer dressed in white as illustrated in FIGS. 6A-6E in corresponding frames FRAME 2, FRAME 3, FRAME 8, FRAME 9 and FRAME 10.

By way of example only and not limitation, the results of tracking with closed-loop training 502 is contrasted with the results of tracking with open-loop training with continuous learning 512 in FIGS. 6A-6E. The closed-loop results 602a begin to diverge from the open-loop results 602b by FRAME 8 in FIG. 6C as indicated by the solid line boundary demarcating a portion of the frame that contains the tracked object, in this example the female street performer. The closed-loop results 602a drift to the right of the female street performer, the discriminatory classifier 504 possibly mistaking the white color of the background door with the white dress of the street performer when using the training sample without the benefit of continuous learning.

In contrast, the open-loop results 602b maintain tracking of the street performer as indicated by the dotted line boundary demarcating a portion of the frame that contains the tracked object, i.e. the female street performer. For example, in FRAME 8 of FIG. 6C and FRAME 9 of FIG. 6D, the female street performer is nearly perfectly centered within the dotted line boundary. By FRAME 10 of FIG. 6E the closed-loop results 602a drift further to the right of the female street performer, whereas the open-loop results 602b continue to be nearly perfectly centered within the dotted line boundary. Each of the open-loop results 602b will be stored as continuous learning training samples cropped from FRAME 0, FRAME 3, FRAME 8, FRAME 9 and FRAME 10 in respective FIGS. 6A-6E. The open-loop results 602b as tracking progresses to FRAME in FIG. 6E indicate that the discriminatory classifier 504 benefits from the continuous learning training samples to improve the accuracy of detection and identification during long-term object tracking.

The above-described scenario of FIGS. 6A-6E is further illustrated in training example 700 illustrated in FIGS. 7A-7D and respective FRAME 22, FRAME 37, FRAME 54 and FRAME 67. The standard tracking algorithm closed-loop results 702a and continuous learning open-loop results 702b are further contrasted with a track with reset algorithm results 702c. As illustrated, the standard tracking algorithm closed-loop results 702a continue to drift rightward and tracking the street performer is lost in FIGS. 7A-7D. The track and reset algorithm results 702c continue to track the street performer in FIGS. 7A-7D, but by FRAME 37 in FIG. 7B, the track and reset algorithm 702c begins to lose a portion of the street performer's right arm. By FRAME 67 in FIG. 7D the track and reset algorithm 702c begins to lose a portion of the street performer's back as well. In contrast, the continuous learning open-loop results 702b continue to maintain an accurate location of the street performer and avoid truncating any significant portion of the street performer.

Figure 8:
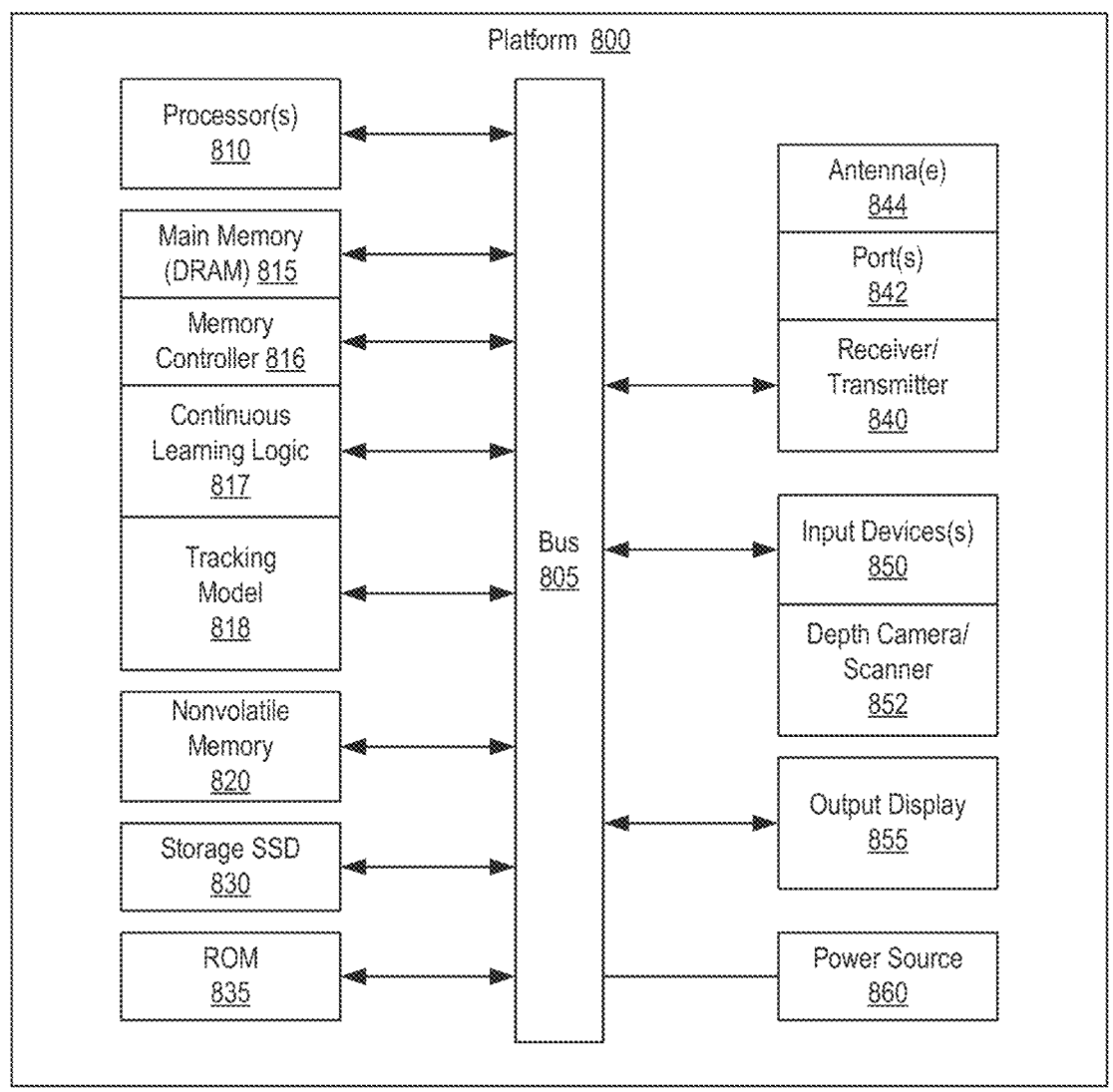
FIG. 8 is a schematic, block diagram illustration of a typical computer system in which embodiments of continuous learning for long-term object tracking could be implemented, either in whole or in part, in accordance with various examples described herein.

FIG. 8 is an illustration of a system in which continuous learning for long-term object tracking can be implemented according to an embodiment. In this illustration, certain standard and well-known components that are not germane to the present description are not shown. Elements shown as separate elements may be combined, including, for example, a SoC (System on Chip) combining multiple elements on a single chip.

In some embodiments, a computing system such as platform 800 may include a processing means such as one or more processors 810 coupled to one or more buses or interconnects, shown in general as bus 805. The processors 810 may comprise one or more physical processors and one or more logical processors. In some embodiments, the processors may include one or more general-purpose processors or special-purpose processors.

The bus 805 is a communication means for transmission of data. By way of example only and not limitation, the bus 805 is illustrated as a single bus, but can represent multiple different interconnects or buses and the component connections to such interconnects or buses may vary. The bus 805 shown in FIG. 8 is an abstraction that represents any one or more separate physical buses, point-to-point connections, or both connected by appropriate bridges, adapters, or controllers.

In some embodiments, the computing system 800 further comprises a random access memory (RAM) or other dynamic storage device or element as a main memory 815 and memory controller 816 for storing information and instructions to be executed by the processors 810. Main memory 815 may include, but is not limited to, dynamic random access memory (DRAM). In some embodiments, the RAM or other dynamic storage device or element includes a tracking model circuit block 818 implementing continuous learning logic 817 to provide training samples to the tracking model logic 818 for carrying out long-term tracking in accordance with the described embodiments.

The computing system 800 also may comprise a non-volatile memory 820; a storage device such as a solid-state drive (SSD) 830; and a read only memory (ROM) 835 or other static storage device for storing static information and instructions for the processors 810.

In some embodiments, the computing system 800 includes one or more transmitters or receivers 840 coupled to the bus 805. In some embodiments, the computing system 800 may include one or more antennae 844, such as dipole or monopole antennae, for the transmission and reception of data via wireless communication using a wireless transmitter, receiver, or both, and one or more ports 842 for the transmission and reception of data via wired communications. Wireless communication includes, but is not limited to, Wi-Fi, Bluetooth™, near field communication, and other wireless communication standards.

In some embodiments, computing system 800 includes one or more input devices 850 for the input of data, including hard and soft buttons, a joy stick, a mouse or other pointing device, a keyboard, voice command system, or gesture recognition system. In one embodiment, the computing system 800 includes one or more depth cameras/scanners 852 to capture data used for image processing, including 3D data. The depth cameras/scanners can include RGB-D (red, green, blue, depth) sensors, and Lidar (Light Detection and Ranging) remote scanners.

In some embodiments, computing system 800 includes an output display 855, where the output display 855 may include a liquid crystal display (LCD) or any other display technology, for displaying information or content to a user. In some environments, the output display 855 may include a touch-screen that is also utilized as at least a part of an input device 850. Output display 855 may further include audio output, including one or more speakers, audio output jacks, or other audio, and other output to the user.

The computing system 800 may also comprise a battery or other power source 860, which may include a solar cell, a fuel cell, a charged capacitor, near field inductive coupling, or other system or device for providing or generating power in the computing system 800. The power provided by the power source 860 may be distributed as required to elements of the computing system 800.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 815 or the non-volatile memory 820 or a combination of such memories, and each of these memories is a form of a machine readable, tangible storage medium.

Hardwired circuitry could be used in combination with software instructions to implement the various embodiments. For example, aspects of the described embodiments can be implemented as software installed and stored in a persistent storage device, which can be loaded and executed in a memory by a processor (not shown) to carry out the processes or operations described throughout this application. Alternatively, the described embodiments can be implemented at least in part as executable code programmed or embedded into dedicated hardware such as an integrated circuit (e.g., an application specific IC or ASIC), a digital signal processor (DSP), a field programmable gate array (FPGA), or controller which can be accessed via a corresponding driver and/or operating system from an application. Furthermore, the described embodiments can be implemented at least in part as specific hardware logic in a processor or processor core as part of an instruction set accessible by a software component via one or more specific instructions.

Thus, the techniques are not limited to any specific combination of hardware circuitry and software or to any particular source for the instructions executed by the data processing system.

All or a portion of the described embodiments can be implemented with logic circuitry, such as the above-described ASIC, DSP or FPGA circuitry, including a dedicated logic circuit, controller or microcontroller, or other form of processing core that executes program code instructions. Thus, processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

Additional example implementations are as follows:

An example method, system, apparatus or computer-readable medium for object tracking comprises at least one channel of a plurality of input frames, a continuous learning dataset for accumulating samples of a target object tracked in an input frame of the plurality of input frames, at least one processor and a continuous learning circuit operated by the at least one processor to detect a target object having at least one feature, track a candidate object in an input frame of the plurality of input frames, and identify the candidate object as the target object based on the at least one feature of the target object and a previously accumulated sample of the target object.

In another example implementation, the continuous learning circuit operated by the at least one processor is further to accumulate a portion of the input frame containing the candidate object identified as the target object in the continuous learning dataset, the portion representing a sample of the target object.

In another example implementation, the continuous learning circuit operated by the at least one processor is further to refine a location of the candidate object identified as the target object to accurately determine the portion of the input frame to accumulate, including performing any of a refinement net and clustering of the candidate object identified as the target object and previously accumulated samples of the target object in the continuous learning dataset.

In another example implementation, to identify the candidate object as the target object based on the at least one feature of the target object and the sample of the target object, the continuous learning circuit operated by the at least one processor is further to determine the at least one feature of the target object is present in the candidate object and the sample of the target object, calculate a target distance between at least one feature present in each of the candidate object and the target object, calculate one or more sample distances between the at least one feature present in each of the candidate object and the sample of the target object, and determine that an average of the calculated target distance and sample distances is within the identity threshold.

In another example implementation, the continuous learning circuit operated by the at least one processor is further to identify the candidate object as not the target object based on the at least one feature present in the candidate object and the sample of the target object, re-detect the target object having the at least one feature and track the candidate object in the input frame of the plurality of input frames using the re-detected target object.

In another example implementation, to identify the candidate object as not the target object based on the at least one feature present in the candidate object and the sample of the target object, the continuous learning circuit operated by the at least one processor is further to calculate one or more target distances between the at least one feature present in each of the candidate object and the target object, calculate one or more sample distances between the at least one feature present in each of the candidate object and the sample of the target object and determine that an average of the calculated target distances and sample distances exceeds the identity threshold.

In another example implementation, the at least one feature present in any of the candidate object, the target object and the sample of the target object includes an appearance of the object capable of variation, including any of a color, shape, direction, and movement feature.

In another example implementation, to track a candidate object in an input frame of the plurality of input frames, the continuous learning circuit operated by the at least one processor is further to perform a classifier to discriminate between the candidate object and other objects based on the at least one feature present in any of the target object, the candidate object and the sample of the target object.

In the foregoing specification, embodiments have been described with reference to specific exemplary embodiments or implementations. It will be evident that various modifications could be made to the described embodiments or implementations without departing from the broader spirit and scope of the embodiments or implementations as set forth in the following claims. The specification and drawings are, accordingly, to be regarded in an illustrative sense rather than a restrictive sense.

What is claimed is:

1. A computer-implemented system for object tracking, the computer-implemented system comprising:
   at least one channel of a plurality of input frames;
   a dataset stored in a database for periodically accumulating samples of a target object tracked in an input frame of the plurality of input frames to continuously learn about the target object;
   at least one processor; and
   a circuit operated by the at least one processor to:
   detect a target object having at least one feature,
   track a candidate object in an input frame of the plurality of input frames,
   identify the candidate object as the target object based on the at least one feature of the target object and a previously accumulated sample of the target object,
   periodically re-identify the candidate object as the target object using a classifier to discriminate between the candidate object and other objects based on the at least one feature present in any of the target object, the candidate object and the previously accumulated sample of the target object, and
   accumulate in the dataset a portion of the input frame containing the candidate object re-identified as the target object, the portion of the input frame representing a sample of the target object for continuous learning.

2. The computer-implemented system of claim 1, wherein to periodically re-identify the candidate object as the target object, the circuit is further to:
   refine a location of the candidate object identified as the target object to determine the portion of the input frame to accumulate, including to perform any one or more of a refinement net and clustering of the candidate object identified as the target object and previously accumulated samples of the target object.

3. The computer-implemented system of claim 1, wherein, to periodically re-identify the candidate object as the target object based on the at least one feature of the target object and the previously accumulated sample of the target object, the circuit is further to:
   determine the at least one feature of the target object is present in the candidate object and the previously accumulated sample of the target object;
   calculate a target distance between at least one feature present in each of the candidate object and the target object,
   calculate one or more sample distances between the at least one feature present in each of the candidate object and the sample of the target object, and
   determine that an average of the calculated target distance and sample distances is within an identity threshold.

4. The computer-implemented system of claim 1, wherein to periodically re-identify the candidate object as the target object based on the at least one feature of the target object and the previously accumulated sample of the target object, the circuit operated by the at least one processor is further to:
   re-detect the target object having the at least one feature; and
   track the candidate object in the input frame of the plurality of input frames using the re-detected target object.

5. The computer-implemented system of claim 4, wherein to periodically re-identify the candidate object as not the target object based on the at least one feature present in the candidate object and the previously accumulated sample of the target object, the circuit operated by the at least one processor is further to:
   calculate one or more target distances between the at least one feature present in each of the candidate object and the target object,
   calculate one or more sample distances between the at least one feature present in each of the candidate object and the sample of the target object, and
   determine that an average of the one or more calculated target distances and the one or more calculated sample distances exceeds an identity threshold.

6. The computer-implemented system of claim 1, wherein the at least one feature present in any of the candidate object, the target object and the sample of the target object includes an appearance of the object capable of variation, including any of a color, shape, direction, and movement feature.

7. A computer-implemented method for object tracking, the computer-implemented method comprising:
  detecting a target object having at least one feature;
  tracking a candidate object in an input frame of a video sequence;
  identifying the candidate object as the target object based on the at least one feature of the target object and one or more previously accumulated samples of the target object;
  periodically re-identifying the candidate object as the target object using a classifier to discriminate between the candidate object and other objects based on the at least one feature present in any of the target object, the candidate object and the one or more previously accumulated samples of the target object; and
  accumulating in a dataset a portion of the input frame containing the candidate object re-identified as the target object, the portion of the input frame representing a sample of the target object for continuous learning.

8. The computer-implemented method of claim 7, wherein the periodically re-identifying of the candidate object as the target object includes:
  refining a location of the candidate object identified as the target object to determine the portion of the input frame to accumulate, including performing any one or more of a refinement net and clustering on the candidate object identified as the target object and the one or more previously accumulated samples of the target object.

9. The computer-implemented method of claim 7, wherein the periodically re-identifying of the candidate object as the target object based on the at least one feature of the target object and the one or more previously accumulated samples of the target object further includes:
  determining the at least one feature of the target object is present in the candidate object and the one or more previously accumulated samples of the target object;
  calculating one or more target distances between at least one feature present in each of the candidate object and the target object;
  calculating one or more sample distances between the at least one feature present in each of the candidate object and the one or more accumulated samples of the target object; and
  determining that an average of the one or more calculated target distances and the one or more calculated sample distances is within an identity threshold.

10. The computer-implemented method of claim 7, wherein the periodically re-identifying of the candidate object as the target object based on the at least one feature of the target object and the one or more previously accumulated samples of the target object further includes:
  identifying the candidate object as not the target object based on the at least one feature present in the candidate object and the one or more accumulated samples of the target object;
  re-detecting the target object having the at least one feature; and
  tracking the candidate object in the input frame of the video sequence using the re-detected target object.

11. The computer-implemented method of claim 10, wherein the periodically re-identifying of the candidate object as not the target object based on the at least one feature present in the candidate object and the one or more previously accumulated samples of the target object further includes:
  calculating one or more target distances between the at least one feature present in each of the candidate object and the target object,
  calculating one or more sample distances between the at least one feature present in each of the candidate object and the sample of the target object, and
  determining that an average of the one or more calculated target distances and the one or more calculated sample distances exceeds an identity threshold.

12. The computer-implemented method of claim 7, wherein the at least one feature present in any of the candidate object, the target object and the sample of the target object includes an appearance of the object capable of variation, including any of a color, shape, direction, and movement feature.

13. An apparatus for object tracking comprising:
  at least one memory;
  at least one processor communicatively coupled to the memory;
  at least one channel of frames of a video sequence;
  at least one processor; and
  a circuit operated by the at least one processor to:
  detect a target object having at least one feature,
  track a candidate object in an input frame of the at least one channel of frames of the video sequence,
  identify the candidate object as the target object based on the at least one feature of the target object and a sample of the target object previously accumulated in the at least one memory,
  periodically re-identify the candidate object as the target object using a classifier to discriminate between the candidate object and other objects based on the at least one feature present in any of the target object, the candidate object and a previously accumulated sample of the target object, and
  accumulate in a dataset a portion of the input frame containing the candidate object re-identified as the target object, the portion of the input frame representing a sample of the target object for continuous learning.

14. The apparatus of claim 13, wherein to periodically re-identify the candidate object as the target object, the circuit operated by the at least one processor is further to:
  refine a location of the candidate object identified as the target object to determine the portion of the input frame to accumulate, including to perform any one or more of a refinement net and clustering on the candidate object identified as the target object and previously accumulated samples of the target object in the at least one memory.

15. The apparatus of claim 13, wherein to periodically re-identify the candidate object as the target object based on the at least one feature of the target object and the previously accumulated sample of the target object, the circuit operated by the at least one processor is further to:
  determine the at least one feature of the target object is present in the candidate object and the previously accumulated sample of the target object;
  calculate a target distance between at least one feature present in each of the candidate object and the target object;
  calculate a sample distance between the at least one feature present in each of the candidate object and the sample of the target object; and
  determine that an average of the calculated target distance and the calculated sample distance is within an identity threshold.

16. The apparatus of claim 13, wherein to periodically re-identify the candidate object as the target object based on the at least one feature of the target object and the previously accumulated sample of the target object, the circuit operated by the at least one processor is further to:
   re-detect the target object having the at least one feature; and
   track the candidate object in the input frame of the at least one channel of frames of the video sequence using the re-detected target object.

17. The apparatus of claim 16, wherein to periodically re-identify the candidate object as not the target object based on the at least one feature present in the candidate object and the previously accumulated sample of the target object, the circuit operated by the at least one processor is further to:
   calculate a target distance between the at least one feature present in each of the candidate object and the target object;
   calculate a sample distance between the at least one feature present in each of the candidate object and the sample of the target object; and
   determine whether an average of the calculated target distance and the calculated sample distance exceeds an identity threshold.

18. The apparatus of claim 13, wherein the at least one feature present in any of the candidate object, the target object and the sample of the target object includes an appearance of the object capable of variation, including any of a color, shape, direction, and movement feature.

19. At least one computer-readable storage medium comprising a plurality of instructions that, when executed on a processor, cause the processor to at least:
   detect a target object having at least one feature;
   track a candidate object in an input frame of a video sequence;
   identify the candidate object as the target object based on the at least one feature of the target object and one or more previously accumulated samples of the target object;
   periodically re-identify the candidate object as the target object using a classifier to discriminate between the candidate object and other objects based on the at least one feature present in any of the target object, the candidate object and the one or more previously accumulated samples of the target object;
   accumulate a portion of the input frame containing the candidate object as the re-identified as the target object in a dataset, the portion of the input frame representing a sample of the target object for continuous learning; and
   refine a location of the candidate object identified as the target object to determine the portion of the input frame to accumulate, including performing any one or more of a refinement net and clustering on the candidate object identified as the target object and the one or more previously accumulated samples of the target object.

* * * * *

UNITED STATES PATENT AND TRADEMARK OFFICE
CERTIFICATE OF CORRECTION

PATENT NO. : 11,978,217 B2
APPLICATION NO. : 17/057084
DATED : May 7, 2024
INVENTOR(S) : Zhang et al.

It is certified that error appears in the above-identified patent and that said Letters Patent is hereby corrected as shown below:

In the Drawings

Sheet 1, FIG. 1, and on the title page, the illustrative print figure, above reference numeral 102, replace "Detection/ReDection" with --Detection/ReDetection--

Signed and Sealed this
Thirtieth Day of July, 2024

Katherine Kelly Vidal
*Director of the United States Patent and Trademark Office*